(12) United States Patent
Wilson et al.

(10) Patent No.: US 7,649,906 B2
(45) Date of Patent: Jan. 19, 2010

(54) METHOD OF REDUCING BUFFER USAGE BY DETECTING MISSING FRAGMENTS AND IDLE LINKS FOR MULTILINK PROTOCOLS AND DEVICES INCORPORATING SAME

(75) Inventors: David James Wilson, Carp (CA); Tim Kuhl, Kanata (CA); Robert John Johnson, Ottawa (CA)

(73) Assignee: Alcatel Lucent, Paris (FR)

( * ) Notice: Subject to any disclaimer, the term of this patent is extended or adjusted under 35 U.S.C. 154(b) by 490 days.

(21) Appl. No.: 11/412,143

(22) Filed: Apr. 27, 2006

(65) Prior Publication Data

US 2007/0253446 A1    Nov. 1, 2007

(51) Int. Cl.
*H04J 3/00*    (2006.01)
(52) U.S. Cl. ...................... 370/464; 370/241
(58) Field of Classification Search ............ 370/464
See application file for complete search history.

(56) References Cited

U.S. PATENT DOCUMENTS

| | | | |
|---|---|---|---|
| 4,417,334 A * | 11/1983 | Gunderson et al. ......... 370/402 |
| 5,625,687 A * | 4/1997 | Sayre, III ................. 379/416 |
| 6,775,305 B1 * | 8/2004 | Delvaux .................. 370/535 |
| 7,145,866 B1 * | 12/2006 | Ting et al. ................ 370/225 |
| 7,187,677 B2 * | 3/2007 | Torsner et al. ............. 370/394 |

OTHER PUBLICATIONS

Sklower et al, The PPP Multilink Protocol (MP), MEMO, Sklower, Lloyd, McGregor & Carr, Nov. 1994.
Sklower et al, The PPP Multilink Protocol (MP), MEMO, Sklower, Lloyd, McGregor & Carr, Aug. 1996.
Mattson et al, End-to-End Multilink Frame Relay Implementation Agreement, FRF.15, Frame Relay Forum Technical Committee, Aug. 1999.
Sheehan et al, Multilink Frame Relay UNI/NNI lmplementatino Agreement, FRF.16.1, Frame Relay Forum Technical Committee, May 2002.

* cited by examiner

*Primary Examiner*—Derrick W Ferris
*Assistant Examiner*—Mang Yeung
(74) *Attorney, Agent, or Firm*—Kramer & Amado, P.C

(57) ABSTRACT

A method of detecting missing fragments and idle links in a link bundle for a multilink protocol, and devices provisioned with program instructions for performing the method, employs a plurality of masks to track the links in the bundle that are active. Idle links are excluded from a determination about whether buffer cleanup should be run in order to reduce unnecessary buffer usage caused by orphaned fragments.

17 Claims, 5 Drawing Sheets

METHOD OF REDUCING BUFFER USAGE BY DETECTING MISSING FRAGMENTS AND IDLE LINKS FOR MULTILINK PROTOCOLS AND DEVICES INCORPORATING SAME

CROSS-REFERENCE TO RELATED APPLICATIONS

This is the first application filed for the present invention.

MICROFICHE APPENDIX

Not Applicable.

TECHNICAL FIELD

The present invention relates in general to multilink protocols and, in particular, to a method of reducing buffer usage by detecting missing fragments and idle links for multilink protocols and devices incorporating the method.

BACKGROUND OF THE INVENTION

Multilink protocols are well known in the art and have been standardized for both point-to-point protocol (MLPPP, also referred to as MP) and Frame Relay protocol (MLFR, also referred to as MFR), among others. Multilink protocols combine multiple physical or logical links and use them together as if they were one high-performance link. MLPPP is described in RFC 1717, which has been updated by RFC 1990. MLFR has is described by specifications FRF.15 and FRF.16

MLPPP and the MLFR Protocols function by fragmenting datagrams or frames and sending the fragments over different physical or logical links. Datagrams or frames received from any of the network layer protocols are first encapsulated into a modified version of the regular PPP or FR frame. A decision is then made about how to transmit the datagram or frame over the multiple links. Each fragment is encapsulated and sent over one of the links.

On a receiving end, the fragments received from all of the links are reassembled into the original PPP or FR frame. That frame is then processed like any other PPP or FR frame, by inspecting the Protocol field and passing the frame to the appropriate network layer protocol.

The fragmenting of data in multilink protocols introduces a number of complexities that the protocols must be equipped to handle. For example, since fragments are being sent roughly concurrently, they must be identified by a sequence number to enable reassembly. Control information for identifying the first and last fragments must also be incorporated in the fragment headers. A special frame format is used for the fragments to carry this information.

FIG. 1 is a schematic diagram illustrating two devices, 12 and 14, provisioned to support multilink protocol communications. A plurality of physical or logical links 16 are allocated to a "link bundle" that provides a single high-performance connection between the devices 12, 14. The devices 12, 14 may be routers, switches, or user terminals. The number of physical or logical links 16 allocated to a connection is a matter of resource availability and design choice. As is understood by those skilled in the art, a certain amount of buffering is required when terminating multiple links to compensate for variations in timing among the links and to account for lost fragments. When dealing with large numbers of link bundles, the requirement for buffering becomes significant and careful management is required.

When multiple links carry fragments simultaneously, it is not uncommon for a fragment to be lost. As shown in FIG. 1, a frame divided in to 15 fragments 18 is missing fragment "10", as indicated by reference number 20. Existing prior art solutions typically implement a simple missing fragment cleaned up scheme and may also use a basic idle link detection scheme that relies on higher level software to handle detection of idle links, as described below with reference to FIGS. 3 and 4.

FIG. 2 is a flow chart illustrating a simple missing fragment clean-up algorithm commonly used in the prior art. At each fragment cleanup timeout, a fragment clean-up algorithm finds a next link bundle to check (step 30). The algorithm then determines whether the sequence number of fragments received from every link is greater than a smallest missing fragment sequence number (step 32). In the examples shown in FIG. 1, the smallest missing fragment sequence number is "10", as described above. If it is determined in step 32 that the fragment sequence number received from each link was larger than the smallest missing sequence number, a buffer cleanup process is run (step 34) and the fragments stored in the buffer belonging to the incomplete frame must be discarded. The algorithm then waits for the next timeout (step 36) before branching back to find the next link bundle to check (step 30).

While the algorithm shown in FIG. 2 is relatively efficient at detecting missing fragments, it does not address the problem of idle links, sometimes referred to as "dead" links.

FIG. 3 is a schematic diagram of the devices shown in FIG. 1 illustrating a problem that arises when one of the physical or logical links in a link bundle becomes idle. In this example, link 22 becomes idle. Consequently, when a frame divided into 30 fragments is transmitted from device 12 to device 14, fragments 5, 10, 15, 20, 25 and 30 are missing. As will be understood by those skilled in the art, this poses a problem for the algorithm shown in FIG. 2. In order to address the problem, some prior art buffer cleanup algorithms rely on higher level software processes to detect idle links. Examples include Loss of Signal (LOS); Alarm Indication Signal (AIS); and, Link Control Protocol (LCP) timeouts, etc. however those higher level software processes generally require long detection times. Furthermore, those higher level software processes have no standardized hooks for freeing up buffers being used to reassembled packets or frames.

FIG. 4 is a flow chart illustrating a missing fragment cleanup algorithm that implements a basic idle link detection scheme. Each time the algorithm executes, it finds a next link bundle to check (step 40). It then determines whether the fragment sequence number received from every link is greater than the smallest missing fragment sequence number (step 42). If not, it determines whether a higher level process has reported a link failure (step 46). If the determination in either of steps 42 or 46 is true, the algorithm runs buffer cleanup (step 44). If not, the algorithm waits for the next timeout (step 48). As explained above, relying on the higher level software process to report link failure wastes valuable time and can lead to serious buffer congestion, buffer overflow and frame or packet loss.

It is therefore highly desirable to provide a method of reducing buffer usage by detecting missing fragments and idle links for multilink protocols. It is also highly desirable to provide devices that implement the method.

SUMMARY OF THE INVENTION

It is an object of the present invention to provide a method of reducing buffer usage by detecting missing fragments and idle links for multilink protocols, and to provide devices that implement the method.

The invention therefore provides a method of detecting missing fragments and idle links in a multilink protocol link bundle, comprising, after each timeout: finding a next link bundle to check; performing active link discovery; determining whether a sequence number received from every active link in the link bundle is greater than a missing sequence number of fragments stored in a buffer used to buffer fragments for the link bundle; and running buffer cleanup if it is determined that a sequence number of a fragment received from every active link is greater than the missing sequence number; else waiting for next timeout.

The invention further provides a network router comprising computer program instructions for performing the method a of detecting missing fragments and idle links in a multilink protocol link bundle, comprising, after each timeout: finding a next link bundle to check; performing active link discovery; determining whether a sequence number received from every active link in the link bundle is greater than a missing sequence number of fragments stored in a buffer used to buffer fragments for the link bundle; and running buffer cleanup if it is determined that a sequence number of a fragment received from every active link is greater than the missing sequence number; else waiting for next timeout.

The invention further provides a network switch comprising computer program instructions for performing the method a of detecting missing fragments and idle links in a multilink protocol link bundle, comprising, after each timeout: finding a next link bundle to check; performing active link discovery; determining whether a sequence number received from every active link in the link bundle is greater than a missing sequence number of fragments stored in a buffer used to buffer fragments for the link bundle; and running buffer cleanup if it is determined that a sequence number of a fragment received from every active link is greater than the missing sequence number; else waiting for next timeout.

The method further provides a user terminal comprising computer program instructions for performing the method a of detecting missing fragments and idle links in a multilink protocol link bundle, comprising, after each timeout: finding a next link bundle to check; performing active link discovery; determining whether a sequence number received from every active link in the link bundle is greater than a missing sequence number of fragments stored in a buffer used to buffer fragments for the link bundle; and running buffer cleanup if it is determined that a sequence number of a fragment received from every active link is greater than the missing sequence number; else waiting for next timeout.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

The invention provides a method of reducing multilink buffer usage by detecting missing fragments and idle links for multilink protocols, and devices incorporating the algorithm. In accordance with the algorithm, active link discovery is performed during each timeout in order to rapidly detect idle links and reduce buffer usage by performing buffer cleanup very soon after any link in a link bundle becomes idle. Active link discovery is performed using link masks to determine which links received fragments since a last timeout, and to determine whether any change has occurred among the links that are active. In order to accomplish this, a bundle link mask; recently active mask; and a previously active mask are maintained. A counter is also maintained to determine how the respective masks are used to determine whether buffer cleanup should be run.

Figure 1:
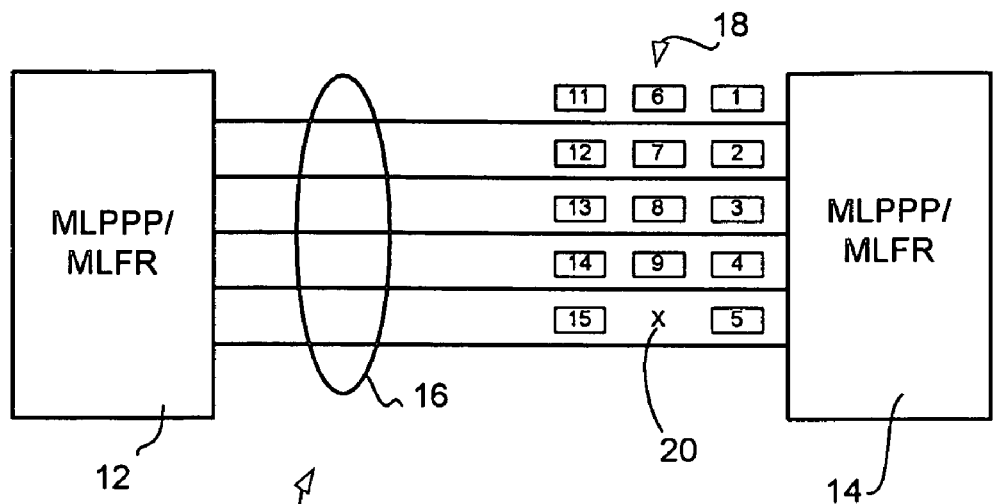
FIG. 1 is a schematic diagram of two devices interconnected by a bundle of physical or logical links configured to function as a single high-bandwidth link using a multilink protocol.
Figure 2:
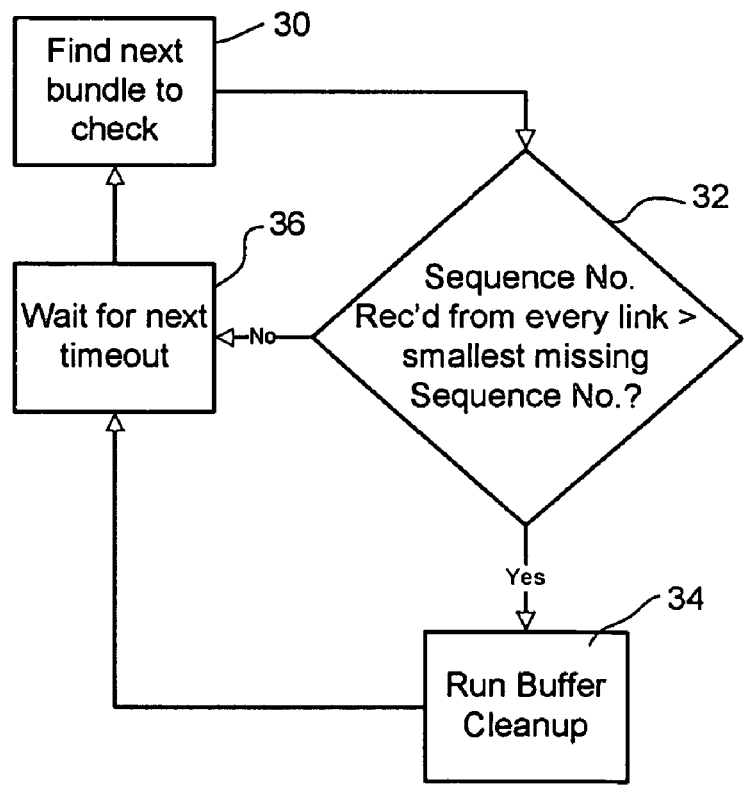
FIG. 2 is a flow chart of a prior art algorithm for detecting missing fragments carried by the bundle of links shown in FIG. 1.
Figure 3:
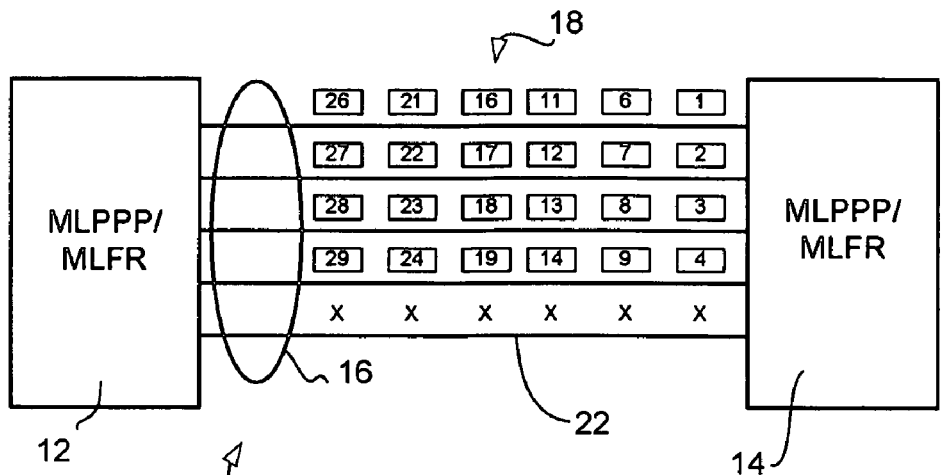
FIG. 3 is schematic diagram of the two devices shown in FIG. 1 when one of the links becomes idle.
Figure 4:
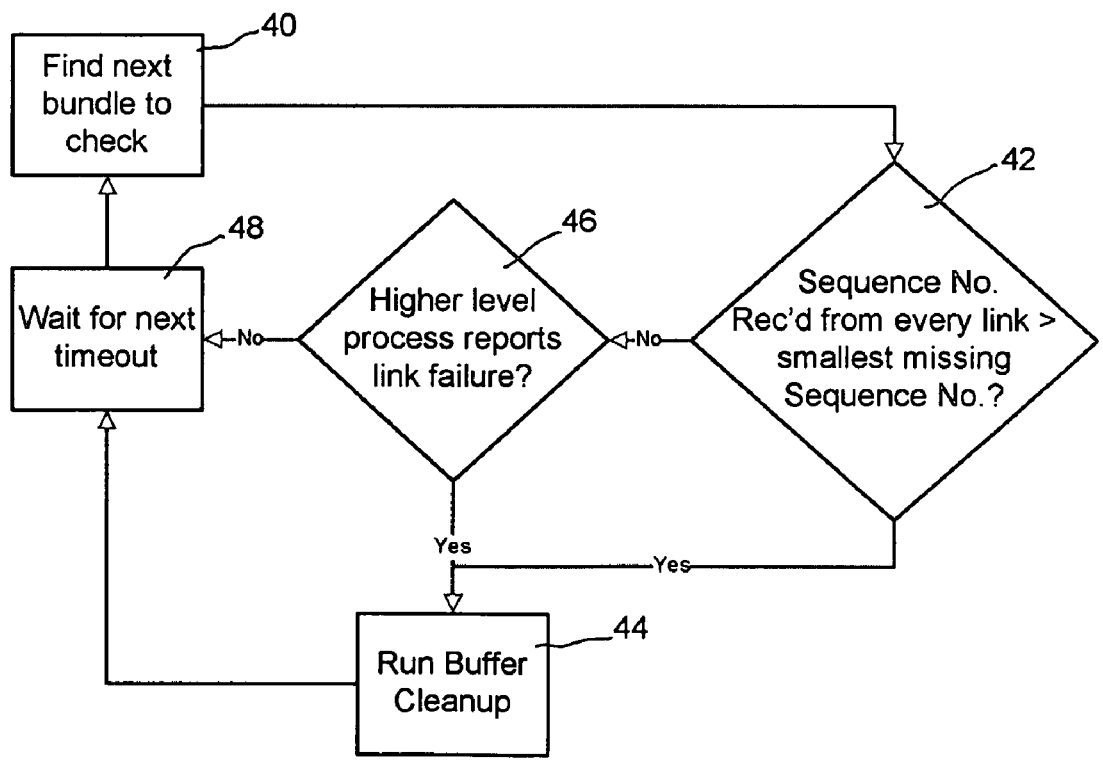
FIG. 4 is a flow chart of a prior art algorithm for detecting missing fragments and idle links carried by the bundle of links shown in FIG. 3.
Figure 5:
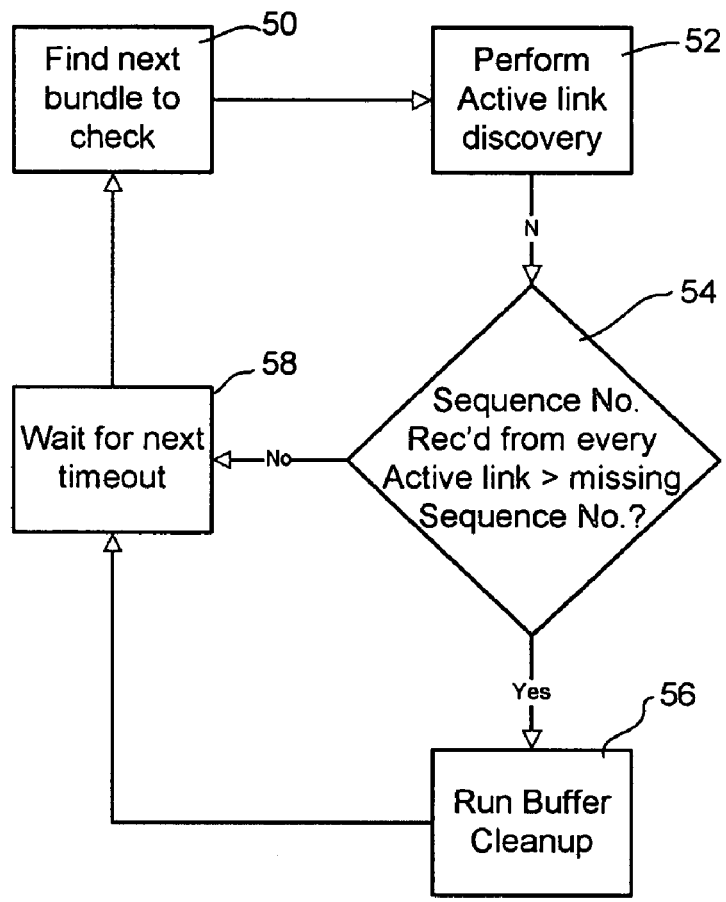
FIG. 5 is a flow chart illustrating the method in accordance with the invention.

FIG. 5 is a flow chart illustrating the buffer cleanup algorithm in accordance with the invention. At an end of an interval between times when the algorithm executes (i.e., a timeout), the algorithm finds a next link bundle to check (step 50). The algorithm then performs active link discovery (step 52), which will be explained below in detail with reference to FIG. 7. After performing active link discovery, the algorithm determines whether a sequence number received from every "active link" is greater than a missing sequence number (step 54). If so, the algorithm executes buffer cleanup to remove any orphaned fragments, in a manner well known in the art (step 56). If not, the algorithm waits for a next timeout (step 58) before repeating the cycle.

Figure 6:
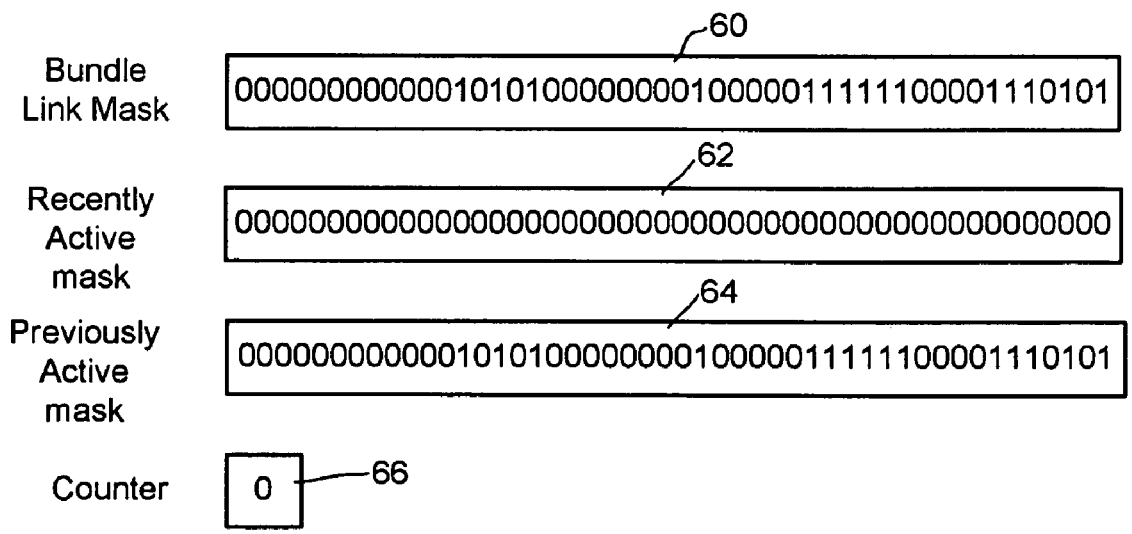
FIG. 6 is a schematic diagram illustrating bundle link masks maintained by the algorithm shown in FIG. 5 and a counter that determines how the bundle link masks are used for missing fragment and idle link detection.

In order to perform active link discovery as described above with reference to step 52, the algorithm maintains three masks and a counter, which are schematically illustrated in FIG. 6. Each mask stores a single bit sequence. A length of the bit sequence is dependent on a number of links in a bundle supported by the device on which the algorithm operates. As understood by those skilled in the art, most multilink protocols can support up to 256 links in a bundle. In this example, the algorithm supports up to 48 links in a bundle. The masks maintained by the algorithm include a bundle link mask 60; a recently active mask 62; and a previously active mask 64. In each of the respective masks 60, 62 and 64, a "1" represents a link in the bundle.

As will be explained below in detail with reference to FIG. 7, the recently active mask is always reset to zero at the end of each cycle. The recently active mask 62 shown in FIG. 6 therefore represents the condition of that mask at the end of a cycle. As can be seen, in this example the previously active mask 64 is identical to the bundle link mask 60. Consequently, there are no idle links in the bundle. The algorithm also maintains a counter 66. The counter 66 is used to determine whether the bundle link mask 60 or the previously active mask 64 will be used during a buffer cleanup, as will likewise be explained below in detail with reference to FIG. 7.

Figure 7:
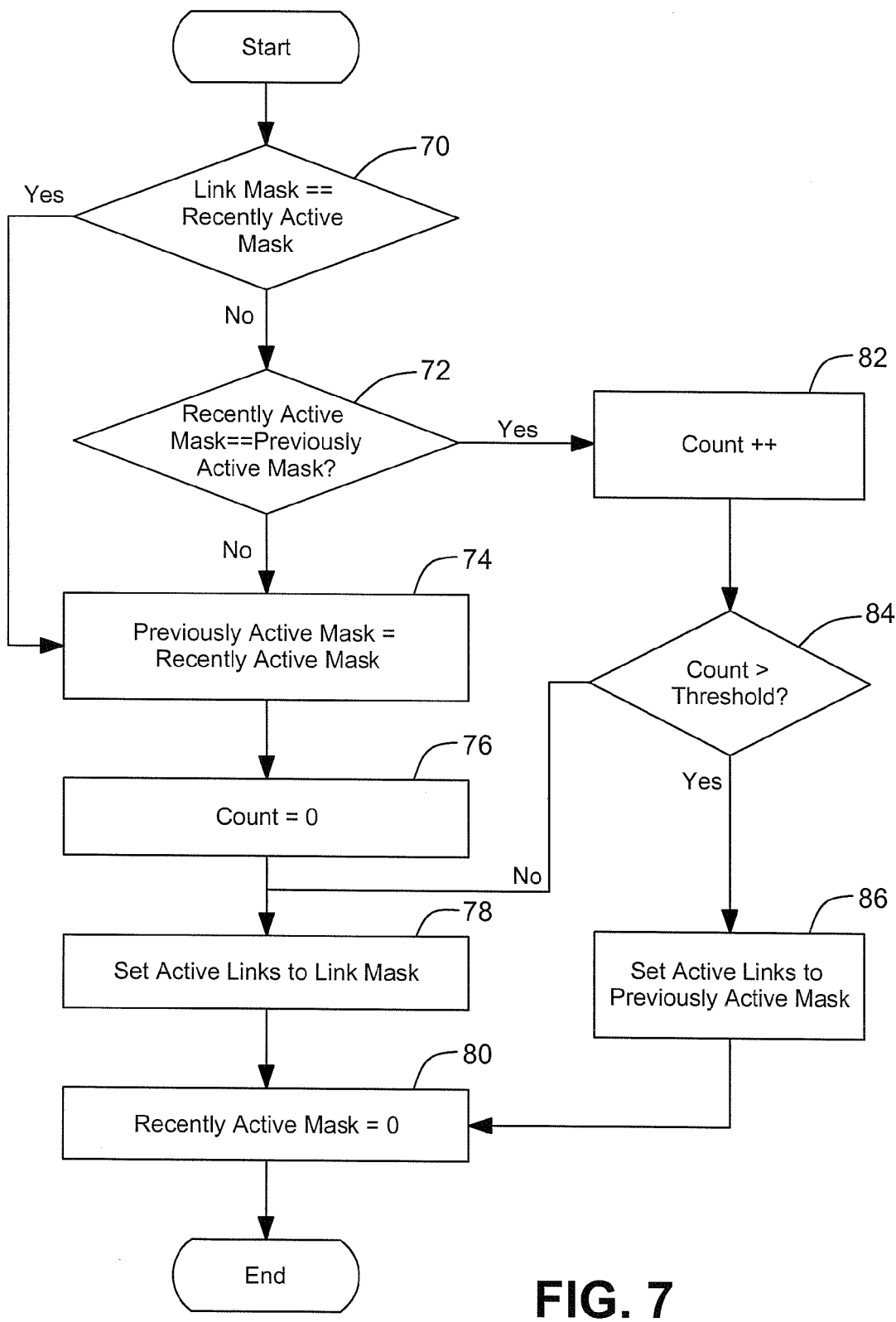
FIG. 7 is a flow chart illustrating active link discovery in accordance with the invention.

FIG. 7 is a flow chart illustrating active link discovery in accordance with the invention. When each active link discovery cycle begins, the algorithm determines whether the bundle link mask 60 equals the recently active mask 62 (step 70). If they are not equal, the algorithm determines whether the recently active mask 62 is equal to the previously active mask 64 (step 72). As explained above with reference to FIG. 6, at the end of each active link discovery cycle the algorithm sets the recently active mask 62 to zeros. Between timeouts, the recently active mask 62 is updated by changing a corresponding zero to a "1" for each link that receives at least one fragment. At the beginning of each new cycle, the recently active mask 62 therefore includes a "1" for each link that received at least one segment since an end of the last cycle.

If it was determined in step 70 that the bundle link mask 60 equals the recently active mask 64, all links in the bundle are active and the algorithm considers all links when determining whether a buffer cleanup should be run (see FIG. 5). Likewise, if the recently active mask 62 does not equal the previously active mask 64 a status of at least one link has changed. In either case, the previously active mask 64 is set equal to the recently active mask 62 (step 74) and the counter 66 is reset to zero (step 76).

If, however, it is determined in step 72 that the recently active mask 62 is equal to the previously active mask 64, at least some of the links in the link bundle are idle and have remained so throughout the cycle. Consequently, the counter 66 is incremented by one (step 82) and it is determined (step 84) whether the count is greater than a predetermined threshold. A value of the predetermined threshold is a matter of design choice. In accordance with one embodiment of the invention, the predetermined threshold is set to 5.

If it is determined that the counter 66 stores a value greater than the threshold, the "active links" are set to the previously active mask 64 (step 86). However, if the counter 66 stores a value that is less than the predetermined threshold, the "active links" are set to the bundle link mask 60 (step 78). In either event, the recently active mask is set to zeros (step 80) and active link discovery is completed.

Figure 8:
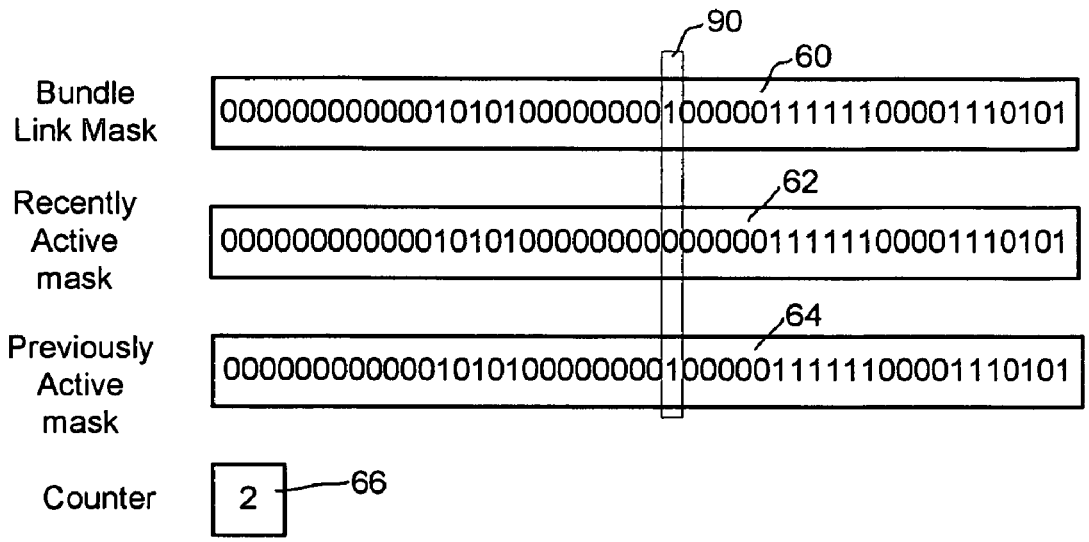
FIG. 8 is a schematic diagram illustrating the respective link masks shown in FIG. 6 after an idle link has been detected.

FIG. 8 is a schematic diagram of the bundle link mask 60; the recently active mask 62; and the previously active mask 64; as well as the counter 66 when a link in the link bundle (link 23 indicated by the box labeled 90) is idle but the counter 66 stores a number (2), which is less than the predetermined threshold (5 in this example). With the link masks 60, 62 and 64 in this condition, the algorithm shown in FIG. 7 will determine (see FIG. 7, step 70) that the bundle link mask 60 is not equal to the recently active mask 62. If the algorithm also determines (see FIG. 7, step 72) that the recently active mask 62 is equal to the previously active mask 64, it increments the count (see FIG. 7, step 82) but determines that the count is still less than the threshold (see FIG. 7, step 84) and therefore determines whether to run buffer cleanup based on the "active links" which are set to the bundle link mask 60 (see FIG. 7, step 78).

Figure 9:
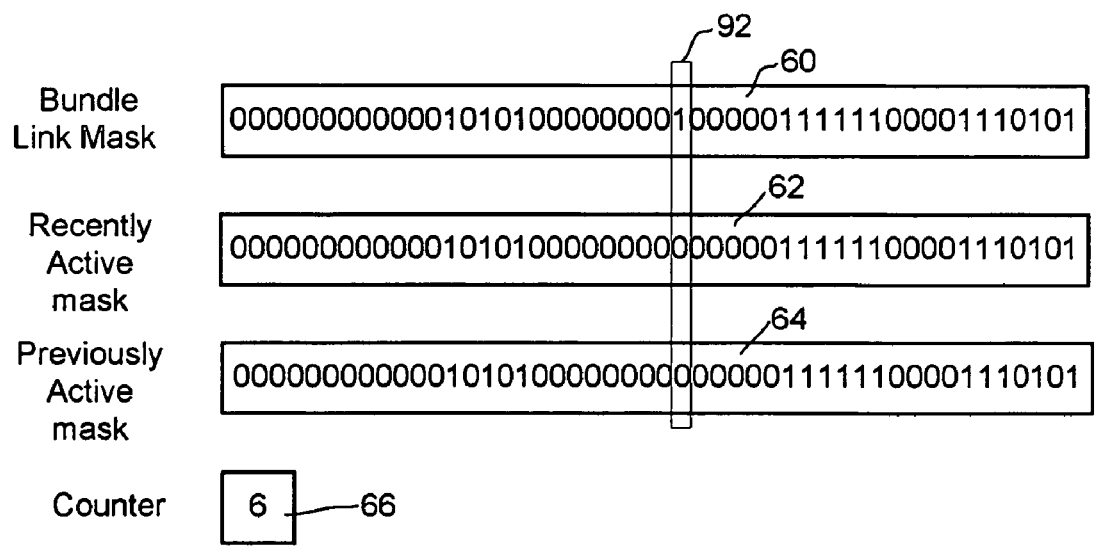
FIG. 9 is a schematic diagram illustrating the respective link masks shown in FIG. 6 after the idle link has been eliminated as an active link by the algorithm shown in FIG. 7.

FIG. 9 is a schematic diagram of the bundle link mask 60; the recently active mask 62; and previously active mask 64 as well as the counter 66 four cycles after their condition shown in FIG. 8. With reference to FIG. 7, it is seen that the algorithm will determine that the bundle link mask 60 is not equal to the recently active mask 62 (see FIG. 7, step 70). The algorithm will also determine that the recently active mask 62 is equal to the previously active mask 64 (see FIG. 7, step 72) and will increment the counter 66 (see FIG. 7, step 82). Consequently, the algorithm will determine that the counter 66 stores a value that is greater than the predetermined threshold (see FIG. 7, step 84) and will determine whether to run buffer cleanup based on the "active links" which are set equal to the previously active mask 64 (see FIG. 7, step 86). As a result, the determination of whether to run buffer cleanup will proceed without consideration of the idle link 23 indicated by the box labeled 92.

The invention therefore permits multilink buffer cleanup to begin much earlier than when higher level software processes are relied on for discovering idle links. Multlink buffer usage is therefore reduced and the probability of uncorrupted packet loss is correspondingly reduced. As will be understood by those skilled in the art, the algorithm in accordance with the invention can be implemented on any device that supports a multilink protocol. Such devices include routers, switches and user terminals.

The embodiments of the invention described above are intended to be exemplary only. The scope of the invention is intended to be limited solely by the scope of the appended claims.

I claim:

1. A method performed at a network node in a communications network of detecting missing fragments and idle links in a multilink protocol link bundle, comprising, after each timeout:
    finding, at the network node, a next link bundle to check;
    maintaining, at the network node, a plurality of bundle link masks to track a condition of links in the link bundle, the plurality of bundle link masks comprising a bundle link mask, a recently active mask, and a previously active mask;
    maintaining, at the network node, a counter to determine which of the bundle link masks is to be used when determining whether a buffer cleanup procedure should be run;
    determining, using the counter and at least one of the plurality of bundle link masks, which of the links belonging to the link bundle are active links;
    determining that a fragment has been lost when a sequence number of a fragment received from each of a plurality of active links in the link bundle is greater than a missing sequence number of fragments stored in a buffer used to buffer fragments for the link bundle; and
    running the buffer cleanup procedure when it is determined that a fragment has been lost.

2. The method as claimed in claim 1 wherein:
    the step of maintaining a plurality of bundle link masks comprises:
        zeroing the recently active mask at an end of each timeout; and
        for each link in the link bundle that receives at least one fragment since the last timeout, setting a bit in the recently active mask corresponding to the link to a value of "1".

3. The method as claimed in claim 2 wherein:

the step of maintaining a plurality of bundle link masks further comprises setting a bit of the bundle link mask to "1" for each link in the link bundle; and the step of determining which of the links belonging to the link bundle are active links further comprises determining whether the recently active mask is equal to the bundle link mask.

4. The method as claimed in claim 3 wherein the step of determining which of the links belonging to the link bundle are active links further comprises:

determining whether the recently active mask is equal to the previously active mask; and setting the previously active mask equal to the recently active mask when it is determined that the recently active mask is not equal to the previously active mask.

5. The method as claimed in claim 4 wherein the step of determining which of the links belonging to the link bundle are active links further comprises incrementing the counter if the recently active mask equals the previously active mask.

6. The method as claimed in claim 5 wherein the step of determining which of the links belonging to the link bundle are active links further comprises determining whether the counter stores a value that is greater than a predetermined threshold.

7. The method as claimed in claim 6 wherein the step of determining which of the links belonging to the link bundle are active links further comprises determining whether the buffer cleanup procedure should be run based on active links set equal to the previously active mask if the counter stores a value which is greater than the predetermined threshold.

8. The method as claimed in claim 7 wherein the step of determining which of the links belonging to the link bundle are active links further comprises setting the recently active mask equal to zeros.

9. The method as claimed in claim 6 wherein the step of determining which of the links belonging to the link bundle are active links further comprises determining whether the buffer cleanup procedure should be run based on active links set equal to the bundle link mask if the counter stores a value which is not greater than the predetermined threshold.

10. The method as claimed in claim 3 wherein if the bundle link mask is equal to the recently active mask, the previously active mask is set equal to the recently active mask and a counter is set to zero.

11. The method as claimed in claim 10 further comprising determining whether the buffer cleanup procedure should be run based on active links set equal to the bundle link mask.

12. The method as claimed in claim 11 further comprising setting the recently active mask to zeros.

13. The method as claimed in claim 4 wherein if the recently active mask is not equal to the previously active mask, the method further comprises setting the previously active mask equal to the recently active mask and setting the counter equal to zero.

14. The method as claimed in claim 13 further comprising determining whether the buffer cleanup procedure should be run based on active links set equal to the bundle link mask.

15. The method as claimed in claim 14 further comprising setting the recently active mask equal to zeros.

16. A system for detecting missing fragments and idle links in a multilink protocol link bundle, comprising:

a plurality of links defining a link bundle;

a buffer used to buffer fragments for the link bundle; and a processor adapted to:

find a next link bundle to check, maintain a plurality of bundle link masks to track a condition of links in the link bundle, wherein the plurality of bundle link masks comprises a bundle link mask, a recently active mask, and a previously active mask, maintain a counter to determine which of the bundle link masks is to be used when determining whether a buffer cleanup procedure should be run, determine which of the links belonging to the link bundle are active links, determine that a fragment has been lost when a sequence number of a fragment received from each of a plurality of active links in the link bundle is greater than a missing sequence number of fragments stored in the buffer, and run the buffer cleanup procedure when it is determined that a fragment has been lost.

17. The system as claimed in claim 16 wherein the processor being adapted to determine which of the links belonging to the link bundle are active links comprises the processor being adapted to:

zero the recently active mask at an end of each timeout, and for each link in the link bundle that receives at least one fragment since the last timeout, set a bit in the recently active mask corresponding to the link to a value of "1".

* * * * *

UNITED STATES PATENT AND TRADEMARK OFFICE
CERTIFICATE OF CORRECTION

PATENT NO.       : 7,649,906 B2
APPLICATION NO. : 11/412143
DATED            : January 19, 2010
INVENTOR(S)      : Wilson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 636 days.

Signed and Sealed this

Twenty-eighth Day of December, 2010

David J. Kappos
*Director of the United States Patent and Trademark Office*